United States Patent
Agner et al.

(10) Patent No.: US 10,710,448 B2
(45) Date of Patent: Jul. 14, 2020

(54) HYBRID MODULE FOR A DRIVE TRAIN OF A MOTOR VEHICLE

(71) Applicant: Schaeffler Technologies AG & Co. KG, Herzogenaurach (DE)

(72) Inventors: Ivo Agner, Bühl (DE); Aurelie Keller, Oberhoffen sur Moder (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 173 days.

(21) Appl. No.: 15/744,109

(22) PCT Filed: Jul. 12, 2016

(86) PCT No.: PCT/DE2016/200320
§ 371 (c)(1),
(2) Date: Jan. 12, 2018

(87) PCT Pub. No.: WO2017/008808
PCT Pub. Date: Jan. 19, 2017

(65) Prior Publication Data
US 2018/0202499 A1    Jul. 19, 2018

(30) Foreign Application Priority Data
Jul. 13, 2015   (DE) .................. 10 2015 213 101

(51) Int. Cl.
*B60K 6/387*    (2007.10)
*F16D 13/38*    (2006.01)
(Continued)

(52) U.S. Cl.
CPC .............. *B60K 6/387* (2013.01); *B60K 6/405* (2013.01); *F16D 13/385* (2013.01); *F16D 13/40* (2013.01);
(Continued)

(58) Field of Classification Search
CPC ......... B60K 6/00–547; F16D 21/00–08; F16D 13/385; F16D 25/00–14; F16D 13/00–76
See application file for complete search history.

(56) References Cited

U.S. PATENT DOCUMENTS 5,691,588 A * 11/1997 Lutz ..................... B60K 6/387
310/92
8,757,305 B2 * 6/2014 Roske ..................... B60K 6/38
180/65.22

FOREIGN PATENT DOCUMENTS

DE   102004034386 A1 * 2/2006 ............... B60K 6/26
DE   102005053887 A1    5/2007
(Continued)

OTHER PUBLICATIONS

International Search Report for PCT/DE2016/200320; 2 pgs; dated Oct. 28, 2016 by European Patent Office.

*Primary Examiner* — David R Morris
*Assistant Examiner* — James J Taylor, II
(74) *Attorney, Agent, or Firm* — Kevin Parks

(57) ABSTRACT

A hybrid module is compact and easy to construct, with components for transmitting torque to at least one transmission input shaft. The disclosed hybrid module includes a counterplate, or at least one counterplate in the case of multiple counterplates, of a clutch device is connected to a rotor element. The connection may be a direct connection, or a connection without intermediate elements, in which no intermediate element is provided for bridging an axial spacing between the rotor and the counterplate. Thus, coupling of an electric machine of the hybrid module and of the clutch device is realized with a minimal structural space requirement. By means of this measure, the clutch device can project into a stator of the electric machine.

19 Claims, 1 Drawing Sheet

(51) Int. Cl.
   *F16D 21/06* (2006.01)
   *F16D 13/40* (2006.01)
   *F16D 13/70* (2006.01)
   *F16D 25/0635* (2006.01)
   *F16D 25/08* (2006.01)
   *B60K 6/405* (2007.10)

(52) U.S. Cl.
   CPC ............ *F16D 13/70* (2013.01); *F16D 21/06* (2013.01); *B60Y 2200/92* (2013.01); *F16D 25/0635* (2013.01); *F16D 25/082* (2013.01); *F16D 2021/0615* (2013.01); *F16D 2021/0669* (2013.01); *Y10S 903/914* (2013.01)

(56) References Cited

FOREIGN PATENT DOCUMENTS

| | | | | |
|---|---|---|---|---|
| DE | 102009038344 A1 | * | 2/2011 | ............ B60K 6/387 |
| DE | 102010003442 A1 | | 10/2011 | |
| DE | 102011104243 A1 | | 12/2012 | |
| DE | 102011117781 A1 | * | 5/2013 | ............ B60K 6/387 |
| EP | 1736345 A1 | | 12/2006 | |
| WO | 2014026685 A1 | | 2/2014 | |

* cited by examiner

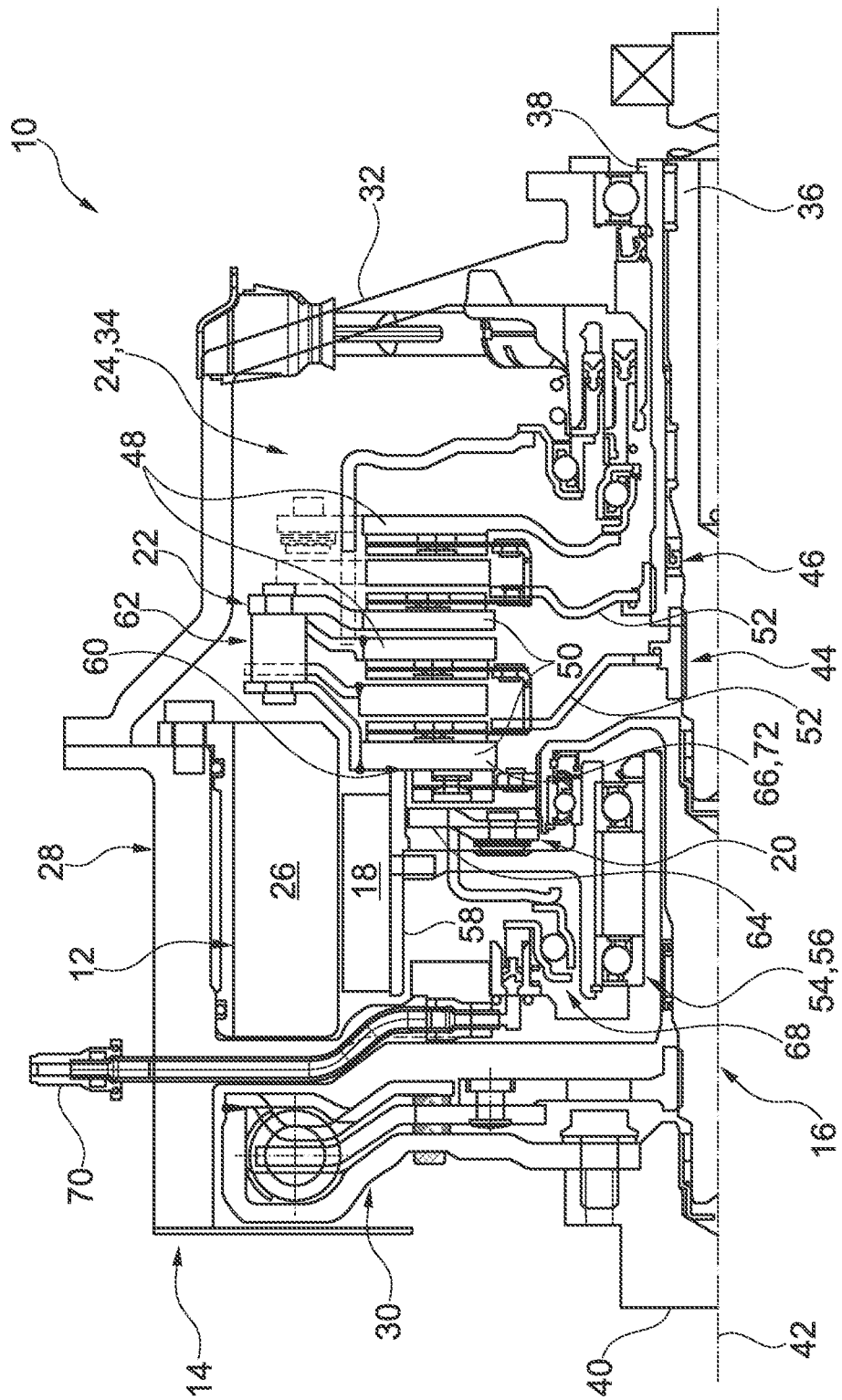

HYBRID MODULE FOR A DRIVE TRAIN OF A MOTOR VEHICLE

CROSS-REFERENCE TO RELATED APPLICATIONS

This application is the United States National Phase of PCT Appln. No. PCT/DE2016/200320 filed Jul. 12, 2016, which claims priority to German Application No. DE102015213101.7 filed Jul. 13, 2015, the entire disclosures of which are incorporated by reference herein.

TECHNICAL FIELD

The present disclosure relates to a hybrid module for a drivetrain of a motor vehicle, which drivetrain has an electric machine, an internal combustion engine and a transmission, wherein the hybrid module has (i) a rotor element which can be driven by means of the electric machine, (ii) a separating clutch which is arranged within the rotor element and which has a pressure plate and a counterplate, and (iii) a clutch device having at least one clutch which comprises a pressure plate and a counterplate.

BACKGROUND

A corresponding hybrid module is known from WO 2014/026685 A1. Said document presents a hybrid module for a drivetrain of a motor vehicle, in which an electric machine is arranged between an internal combustion engine and a transmission. The hybrid module has a rotor of the electric machine and has a separating clutch arranged within the rotor, which separating clutch has a pressure plate and a counterplate. Furthermore, in conjunction with such hybrid modules, there is generally provided in the drivetrain a clutch device with at least one friction clutch, which in turn has a pressure plate and a counterplate.

BRIEF SUMMARY

The present disclosure describes a hybrid module, which is easy to construct and which is at the same time compact, with components for transmitting torque to at least one transmission input shaft.

In the case of the hybrid module according to the disclosure, it is provided that the counterplate, or at least one of the counterplates in the case of multiple counterplates, of the clutch device is connected to the rotor element. Here, said connection may be a direct connection, or a connection without intermediate elements, in which no intermediate element is provided for bridging an axial spacing between rotor and counterplate of the clutch device. Thus, coupling of the electric machine of the hybrid module and of the clutch device is realized with a minimal structural space requirement. By means of this measure, the clutch device can project into the stator of the electric machine.

The rotor element may be the rotor of the electric machine or some other rotor element that can be driven by the electric machine, in particular a roller that can be driven via a belt drive.

Further embodiments of the disclosure are characterized by the following features.

In one embodiment, it is provided that the hybrid module has a common component of the separating clutch and of the clutch device, which component forms the counterplate of the separating clutch and the counterplate, which is connected to the rotor element, of the clutch device. This yields a particularly compact construction.

In a further embodiment, it is provided that the connection between the rotor element and the counterplate is realized as a direct connection between a rotor lamination of the rotor element and the counterplate.

In an embodiment, it is provided that the (direct) connection between the rotor element and the counterplate is formed as a welded, riveted or screwed connection or any desired combination of these.

Alternatively, the rotor element is screwed or riveted to the counterplate of the clutch device. It is possible here (if the separating clutch or K0 separating clutch is notionally relocated in the direction of the clutch device) for the counterplate of the separating clutch to be omitted, whereby the disk of the separating clutch is pressed directly against the (rear side of the) counterplate of the clutch device.

In general, the clutch device may be formed as a single clutch or as a multiple clutch. In a further embodiment, the clutch device is formed as a multiple clutch with several clutches, in particular as a dual clutch with two clutches (clutch units). Here, it is provided that a further counterplate of the clutch device is connected via at least one intermediate element to the rotor element.

According to a yet further embodiment, the hybrid module has a unit composed of the rotor element, of the separating clutch and of a clutch part which comprises the counterplate of the clutch device, and composed also of a central bearing device in the rotor element, by means of which central bearing device the unit is rotatably mounted in a housing unit of the hybrid module.

In an embodiment, it is provided that the separating clutch is formed as a hydraulically actuable clutch.

The hybrid module has a disengagement device formed as a concentric slave cylinder (CSC) for actuating the separating clutch by means of a pressure pot. The separating clutch may be hydraulically actuated by means of a CSC with short pistons. In this way, by means of a tilting degree of freedom, oblique positions of the actuation system of the separating clutch can be compensated.

The separating clutch itself can be actuated by means of a pressure pot without an additional lever ratio. Owing to a low level of hysteresis as a result of the direct actuation, the separating clutch can then be regulated in terms of pressure. The CSC and engagement bearing are preferably in a radially nested arrangement.

In a further embodiment, it is provided that the hybrid module has a dual-mass flywheel which is connected upstream of the separating clutch in the drivetrain.

BRIEF DESCRIPTION OF THE DRAWINGS

An embodiment, to which this disclosure is however not restricted and from which further features according to the disclosure can emerge, is shown in the following FIGURE.

The FIGURE shows a hybrid module according to an example embodiment.

DETAILED DESCRIPTION

The FIGURE shows a part of a drivetrain 10 of a motor vehicle in a sectional illustration. In the drivetrain 10, an electric machine 12 is arranged between an internal combustion engine (not shown) and a transmission (likewise not shown). The electric machine 12 serves as drive machine and is part of a hybrid module 14. Said hybrid module 14 has the following main components: (i) a functional unit 16 having a rotor element 18 formed as a rotor of the electric machine 12, having a separating clutch 20 arranged within the rotor element 18 and having at least one clutch part 22, which is connected rotationally conjointly to the rotor element 18, of a clutch device 24, (ii) a housing unit 28 which partially accommodates the module unit 16 and a stator 26 of the electric machine 12, (iii) a dual-mass flywheel 30 which is connected upstream of the separating clutch 20 in the drivetrain 10, and (iv) a housing part, which accommodates the starting clutch 24, of the transmission 32. The clutch device 24 is formed as a dual clutch 34. Accordingly, the transmission is formed as a dual-clutch transmission, of which only the two transmission input shafts 36, 38 are illustrated.

The following path of the drivetrain is realized: Output shaft 40 of the internal combustion engine—dual-mass flywheel 30—separating clutch 20—rotor element 18 (in this case rotor of the electric machine 12 formed as an internal-rotor machine)—clutch device 24—transmission input shaft 36, 38. Here, the corresponding shafts 36, 38, 40 lie on a common axis 42, which forms the main axis of the hybrid module 14.

The clutch device 24, which is formed as a dual clutch 34, has two clutches 44, 46 with corresponding pressure plates 48, counterplates 50, clutch disks 52 and actuation devices.

The rotor element 18 has, in its interior, a rotor bearing arrangement 54 which serves as central bearing device 56, by means of which the entire module unit 16 is rotatably mounted in the housing unit 28. The rotationally conjoint connection between rotor element 18 and clutch part 22 is in this example realized as a direct connection 60 between a rotor lamination 58 of the rotor element 18 and one of the counterplates 50 of the starting clutch 24, specifically the counterplate of the first clutch 44. Between the rotor element 18 and another counterplate 50, that is to say the counterplate of the second clutch 46, a connection is realized by means of intermediate elements 62. The counterplate 50 of the first clutch 44 and the counterplate 50 of the second clutch 46 are thus also connected to one another via said intermediate elements 62.

The separating clutch 20 is hydraulically actuable. The separating clutch 20 has a pressure plate 64 and a counterplate 66 and is actuated by means of a disengagement device 68 via a pressure connector 70. The disengagement device 68 has a disengagement bearing, a central disengagement unit with a piston for transmitting force to the disengagement bearing, and a pressure pot for transmitting force from the disengagement bearing to the pressure plate of the separating clutch 20. The transmission of force by means of said pressure pot is a transmission of force without a lever action.

One of the counterplates 50 of the clutch device 24 is connected to the rotor element 18. The connection of said one counterplate 50 of the clutch device 24 to the rotor element 18 is in this case a connection in which no intermediate element is provided for bridging an axial spacing between rotor element 18 or separating clutch 20 and the counterplate 50 of the clutch device 24 (direct connection, or connection without intermediate elements). Thus, coupling of the electric machine 12 and of the separating clutch 20 of the hybrid module 14 and of the starting clutch 24 is realized with a minimal (axial) structural space requirement. By means of this measure, the clutch device 24 can project into the stator 26 of the electric machine 12.

LIST OF REFERENCE DESIGNATIONS

10 Drivetrain
12 Machine, electric
14 Hybrid module
16 Functional unit
18 Rotor element
20 Separating clutch
22 Clutch part
24 Clutch device
26 Stator, electric machine
28 Housing unit
30 Dual-mass flywheel
32 Housing part (transmission)
34 Dual clutch
36 Transmission input shaft, first
38 Transmission input shaft, second
40 Output shaft
42 Axis
44 Clutch, first
46 Clutch, second
48 Pressure plate
50 Counterplate
52 Clutch disk
54 Rotor bearing arrangement
56 Bearing device, central (module unit)
58 Rotor lamination
60 Connection
62 Intermediate element
64 Pressure plate (separating clutch)
66 Counterplate (separating clutch)
68 Disengagement device
70 Pressure connector
72 Component, common

The invention claimed is:

1. A hybrid module for a drivetrain of a motor vehicle comprising:
   a rotor element arranged to be driven by an electric machine;
   a separating clutch comprising a first pressure plate and a first counterplate; and
   a clutch device comprising a first clutch and a second clutch, wherein
      the separating clutch is arranged within the rotor element;
      the clutch device includes a second pressure plate and the first counterplate;
      the first counterplate comprises a first face for receiving a torque from the separating clutch and a second face for transmitting the torque to the first clutch; and,
      the first counterplate is connected to the rotor element.

2. The hybrid module of claim 1, wherein:
   the rotor element comprises a rotor lamination; and,
   the first counterplate is directly connected to the rotor lamination.

3. The hybrid module of claim 1, wherein:
   the first counterplate is connected to the rotor element by a welded connection, a riveted connection, or a screwed connection.

4. The hybrid module of claim 1, further comprising a second counterplate and an intermediate element, wherein the intermediate element connects the second counterplate to the first counterplate and the rotor element.

5. The hybrid module of claim 1, further comprising a housing unit, wherein:
   the rotor element comprises a central bearing device;
   the rotor element, the separating clutch, and the first counterplate comprise a functional unit; and,
      the functional unit is rotatably mounted in the housing unit by the central bearing device.

6. The hybrid module of claim 1, wherein the separating clutch is a hydraulically actuable clutch.

7. The hybrid module of claim 1, further comprising a concentric slave cylinder for actuating the separating clutch.

8. A drivetrain for a motor vehicle comprising:
the electric machine;
an internal combustion engine;
a transmission; and,
the hybrid module of claim 1.

9. The hybrid module of claim 1 wherein the first counterplate is an annular disk.

10. The hybrid module of claim 1 wherein the first counterplate comprises a thickness and the first face is axially offset from the second face by the thickness.

11. A hybrid module for a drivetrain of a motor vehicle comprising:
 a rotor element arranged to be driven by an electric machine;
 a separating clutch comprising a first pressure plate and a first counterplate;
 a dual-mass flywheel connected upstream of the separating clutch in the drivetrain; and
 a clutch device comprising a first clutch, wherein
  the separating clutch is arranged within the rotor element;
  the clutch device includes a second pressure plate and the first counterplate;
  the first counterplate comprises a first face for receiving a torque from the separating clutch and a second face for transmitting the torque to the first clutch; and,
  the first counterplate is connected to the rotor element.

12. The hybrid module of claim 11, wherein:
the rotor element comprises a rotor lamination; and,
the first counterplate is directly connected to the rotor lamination.

13. The hybrid module of claim 11, wherein:
the first counterplate is connected to the rotor element by a welded connection, a riveted connection, or a screwed connection.

14. The hybrid module of claim 11, wherein the clutch device comprises a second clutch.

15. The hybrid module of claim 14, further comprising a second counterplate and an intermediate element, wherein the intermediate element connects the second counterplate to the first counterplate and the rotor element.

16. The hybrid module of claim 11, further comprising a housing unit, wherein:
the rotor element comprises a central bearing device;
the rotor element, the separating clutch, and the first counterplate comprise a functional unit; and,
the functional unit is rotatably mounted in the housing unit by the central bearing device.

17. The hybrid module of claim 11, wherein the separating clutch is a hydraulically actuable clutch.

18. The hybrid module of claim 11, further comprising a concentric slave cylinder for actuating the separating clutch.

19. The hybrid module of claim 11 wherein the first counterplate is an annular disk.

* * * * *